ENCODER SYSTEMS

Filed Feb. 16, 1961 5 Sheets-Sheet 1

Howard M. Fleming, Jr.
INVENTOR.

BY Michael P. Preston

ENCODER SYSTEMS

Howard M. Fleming, Jr.
INVENTOR.

BY Michael P. Beeston

Howard M. Fleming, Jr.
INVENTOR.
BY Michael P. Breston

Howard M. Fleming, Jr.
INVENTOR.

BY Michael P. Breston

Howard M. Fleming, Jr.
INVENTOR.

BY Michael P. Breston

United States Patent Office 3,170,154
Patented Feb. 16, 1965

3,170,154
ENCODER SYSTEMS

Howard M. Fleming, Jr., Lebanon, N.J., assignor to Electro-Mechanical Research, Inc., Sarasota, Fla., a corporation of Connecticut Filed Feb. 16, 1961, Ser. No. 89,853
3 Claims. (Cl. 340—347)

This invention relates to magnetic position encoders and more particularly to improved means for reading standard code patterns in such encoders.

By accurately translating mechanical motion into a set of two level electrical signals which represent the digits of a number corresponding to the position of a moving member or shaft, position encoders have rapidly become a vital link of communication between mechanical apparatus and digital handling systems. Moreover, since the advent of magnetic encoders, the complexity and unreliability generally associated with brush or optical type encoders have now been substantially eliminated. However, one factor still limiting the accuracy, speed and efficiency of magnetic encoders is due to the employed readout techniques.

Because the primary function of an encoder is to convert angular or linear displacements into sets of digits or numbers (each number may be represented by as many as twenty or more digits), it is of the essence that each angular or linear position of the moving member be characterized by a distinct set of digits. If an ambiguity can occur in the reading of the code scale on the moving member, erroneous output numbers will appear which are not related to any distinct position of the moving member. Because it is generally easier to build devices with two stable states (leading to binary numbers) than with ten stable states (needed for decimal numbers), modern digital computers are accordingly designed to operate with binary numbers. However, since in the standard or pure binary numerical system, adjacent numbers can differ by more than one digit, special care must be exercised in reading the code pattern. Thus, in the magnetic shaft position encoder employing a pure binary code, the readout problem is to ensure that the sets of digits change simultaneously with changing shaft positions. This problem can theoretically be solved by aligning the readout heads with infinite accuracy on a radial line in order that the heads can become simultaneously activated or deactivated with changing shaft positions. A complete discussion of the nature of the ambiguity problem involved along with several suggested solutions can be found in sections 6–40 to 6–70 of "Notes on Analog-Digital Conversion Techniques," edited by Alfred K. Susskind, and published in 1957 by the Department of Electrical Engineering of MIT.

To avoid ambiguity errors, some digital systems do not accept from the encoder information "on the fly" but only after the input shaft has been stopped and locked in position. Although this technique prevents the use of any count which might have resulted during the transient period between shaft positions, it greatly decreases the amount of available data since, for each reading, the input shaft must be repositioned, stopped and locked. Other shaft position encoders do permit "on the fly" readout, but these encoders employ either special numerical codes such as the reflected binary ("Gray") code in which only one digit can change at a time, or some combination of electrical and mechanical techniques which prevents the occurrence of erroneous readings. Encoders employing such special numerical systems, however, provide numbers which are generally not compatible with the input required by most computing machines and, therefore, the output of the encoder must first be translated into pure binary numbers.

Another common method for eliminating ambiguity employs the "V-brush" principle as illustrated in FIGS. 6–21 of Susskind. In this method, a single brush is used on the finest or least significant track and two brushes on all remaining tracks. The paired brushes on each successive track are spaced ±½, ±1, ±2, . . . units from a reading index line drawn through the center of the single brush; the unit of measurement is taken as the length of a segment on the least significant track. Only one brush at a time is read on each track. External logical circuits are therefore employed to determine, for each track, which brush is to be read. The reading of the least significant, or first track, determines whether the leading or lagging brush will be read on the second track. Similarly, the reading of the second track determines whether the leading or lagging brush will be read on the third track, and so on.

Although the "V-brush" method may give a reading in natural binary code without ambiguity, it requires a great number of external logical circuits for its successful operation, inasmuch as a logical "decision" must be made for each consecutive track. Moreover, since the separation between each pair of brushes doubles as one progresses from the least significant to the most significant track, the leading and the lagging brushes cannot be conveniently mounted in groups, for example, on two separate boards, but each leading and each lagging brush must be separately mounted in the encoder. The necessity of staggering the brushes greatly complicates the mechanical design of the encoder. In addition, although the "V-brush" method may produce, in commutator (brush) type encoders, satisfactory results, it has been found highly impractical for compact magnetic encoders.

Accordingly, it is an object of this invention to provide new and improved magnetic position encoders which produce pure binary numbers without ambiguity.

It is another object of this invention to provide new and improved magnetic position encoders for translating linear or angular displacements into pure binary numbers even when the displacements are at a very high speed.

It is a further object of this invention to provide new and improved magnetic position encoders which require a minimum of external logical circuits.

It is still a further object of this invention to provide new and improved magnetic position encoders in which several pickup units can be grouped together.

These and other apparent objects of the present invention are accomplished by providing position encoders with one or more linear or circular scales, each scale having a code pattern including a plurality of standard binary tracks thereon; the least significant track on the first scale having a single first pickup unit and each of the remaining tracks on each scale having a leading and a lagging pickup unit spaced apart. Each leading pickup unit is separated from its corresponding lagging pickup unit on the same track by a distance equal to a quantum of the least significant track. Logical networks are provided for selecting either all the leading or all the lagging pickup units on the first scale depending upon the output of said single pickup unit. Similarly, all the leading or all the lagging pickup units on each consecutive scale are selected in dependence upon the most significant output digit of the preceding scale.

Other objects and advantages of the present invention will become apparent from the following detailed description when considered in conjunction with the accompanying drawings in which:

FIG. 1 is a block diagram illustrating the fundamental arrangement of the system for producing a binary coded representation of some function of a condition driving the movable member such as a shaft or the like;

FIG. 2 is a schematic, side elevation view, partly in cross-section, of one preferred embodiment of the encoder shown in FIG 1;

Figures 1, 2:
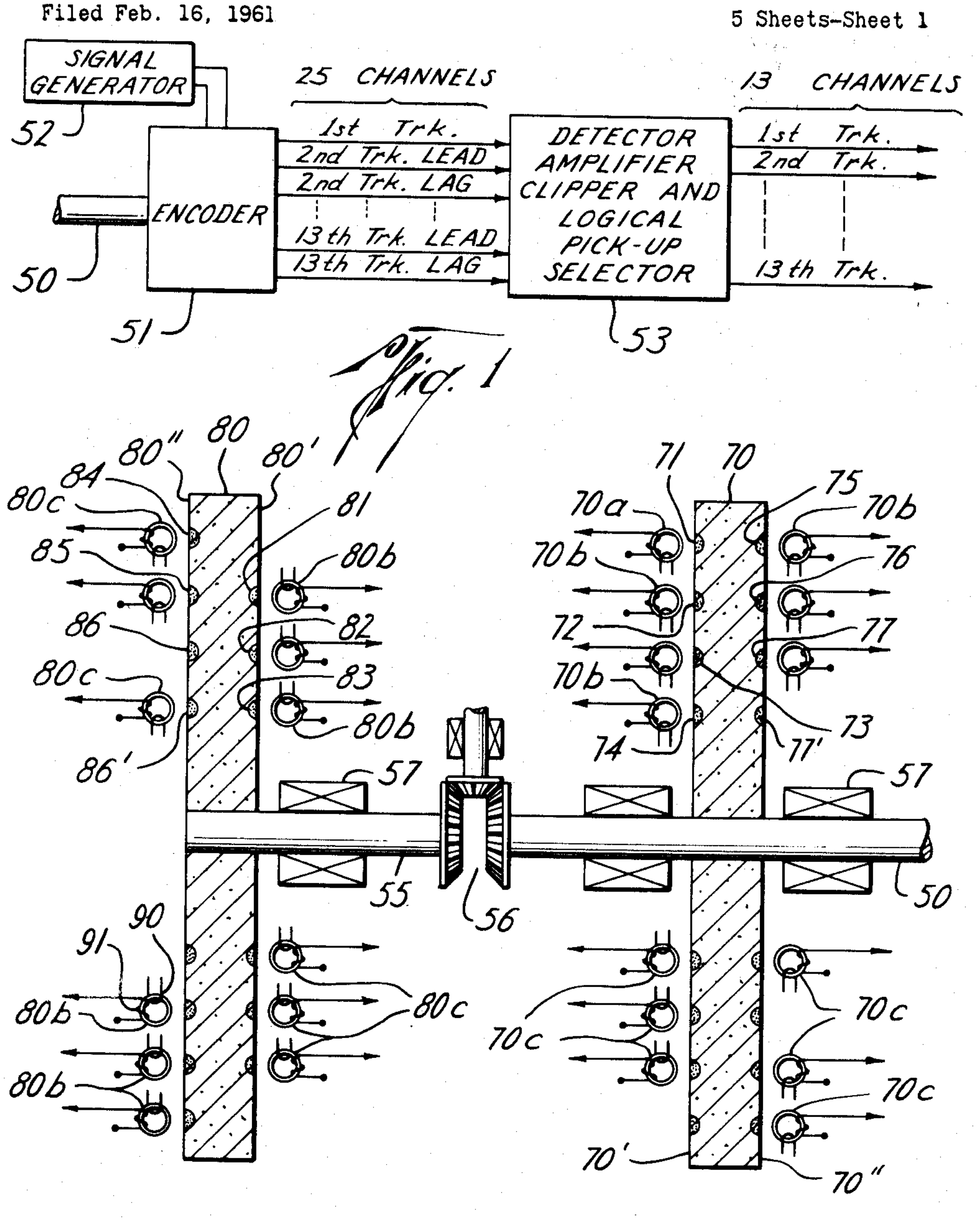
Figures 3, 4, 5:
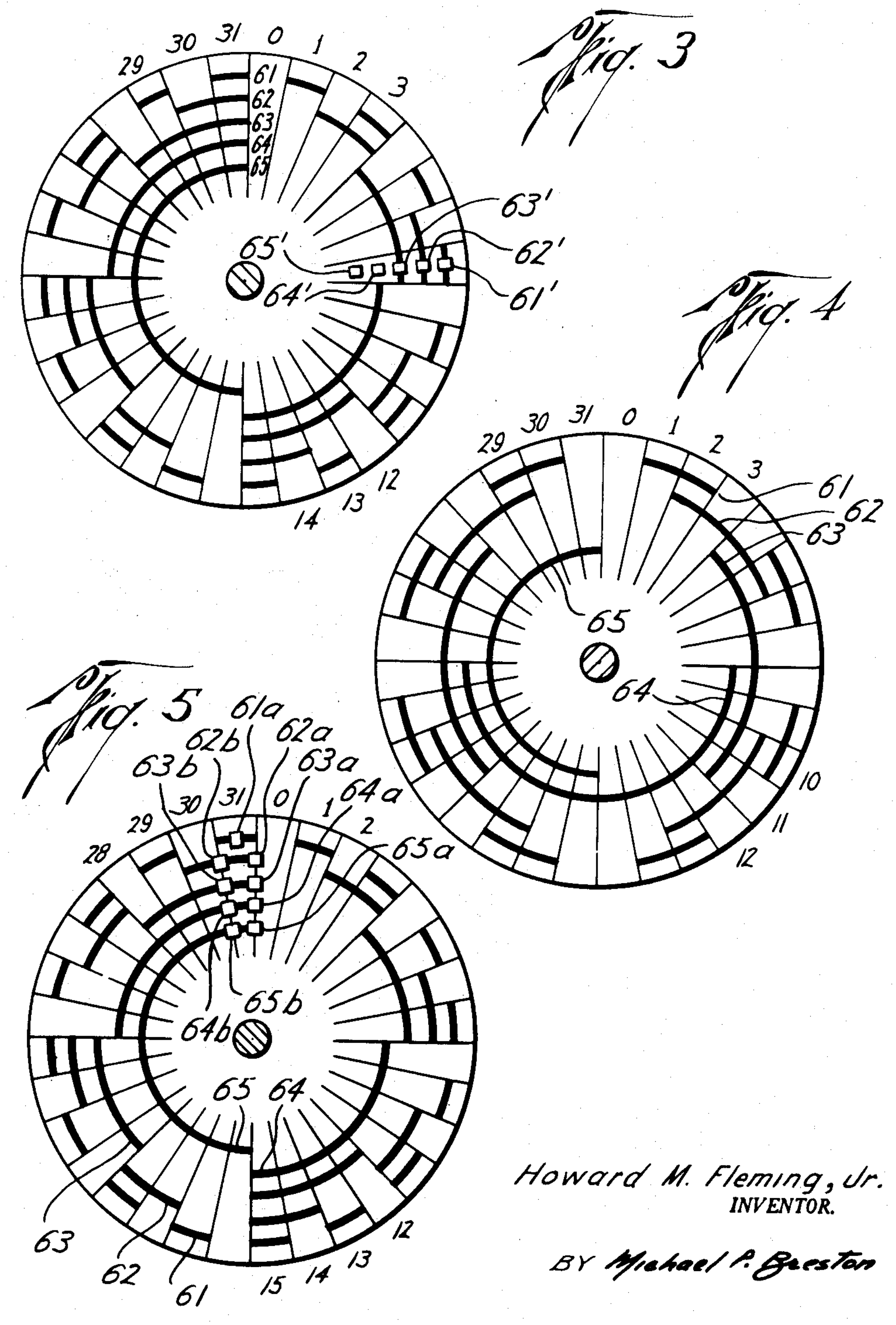
Figure 8:
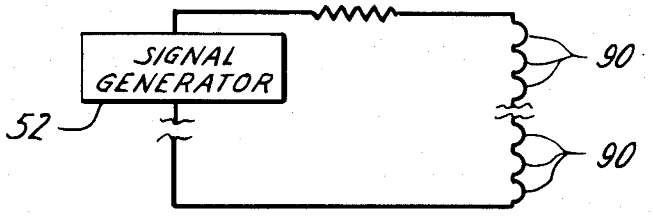
Figure 10:
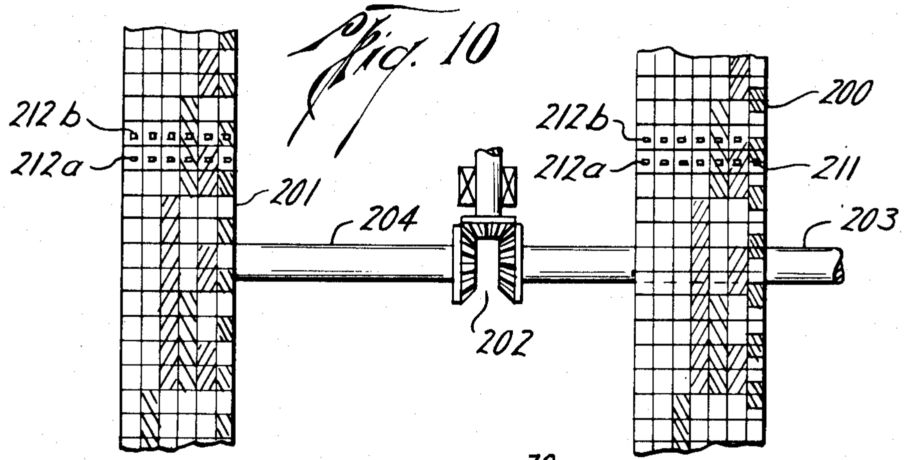
Figure 11:
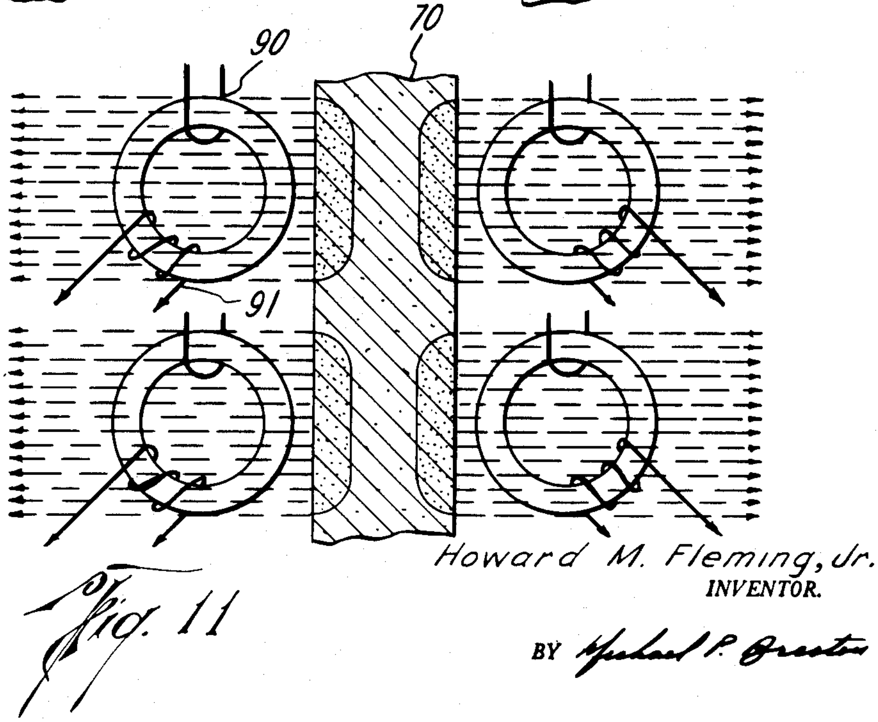
Figure 9:
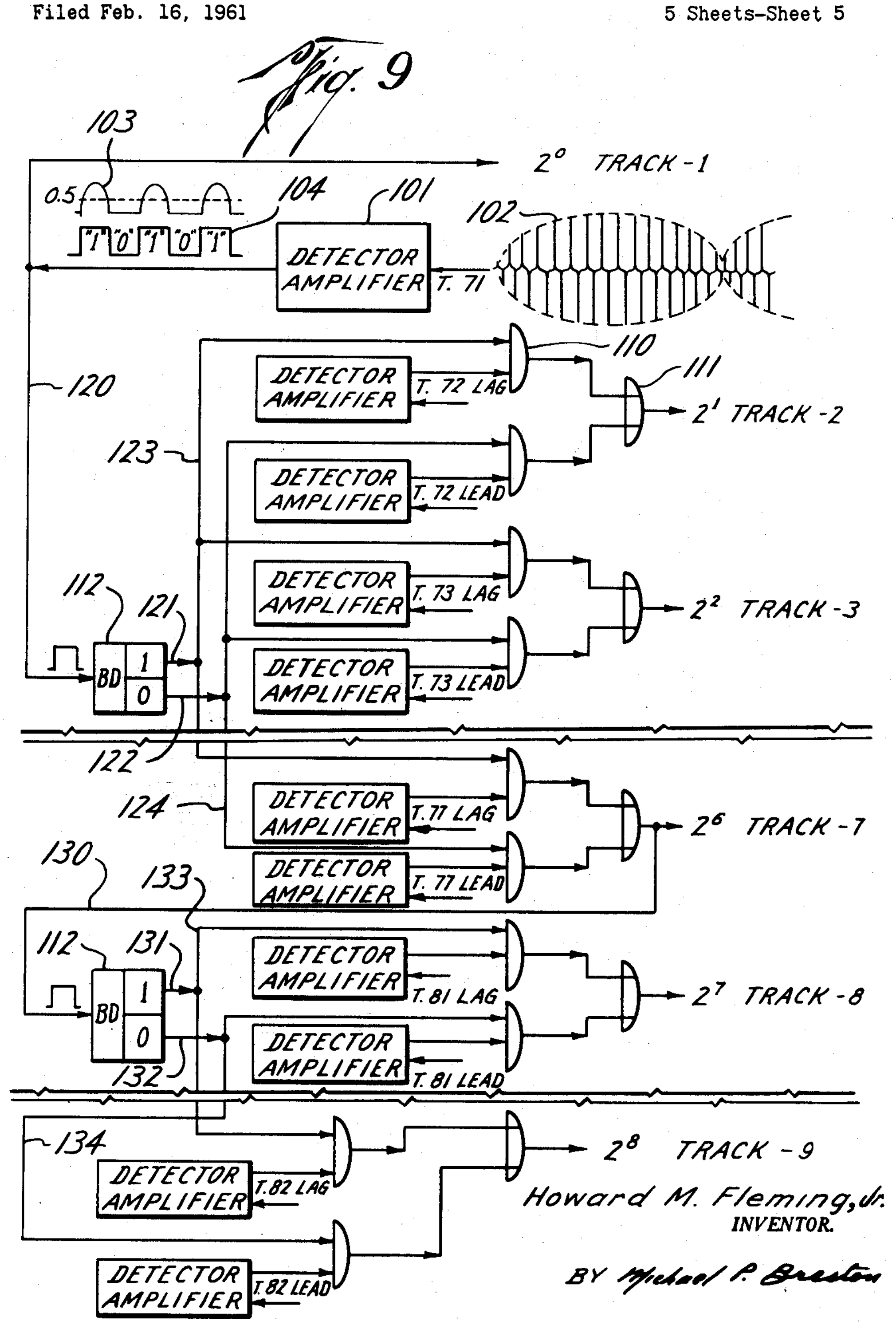

FIGS. 3, 5, 6, 7*a* and 7*b* illustrate, in elementary form, binary code record disks for the encoding of shaft positions in digit signals in the pure binary code;

FIG. 4 illustrates a record disk for the encoding of shaft positions in digit signals of a cyclic binary ("Gray") code;

FIG. 8 is a schematic circuit diagram illustrating the series connections of all the interrogating windings in the encoder of FIG. 2;

FIG. 9 is a schematic circuit diagram illustrating the electrical networks which may be used in the encoder system of FIG. 1;

FIG. 10 is a schematic representation of another embodiment of an encoder which can be used in conjunction with FIG. 1; and FIG. 11 is a partial enlarged view in cross-section of the disk shown in FIG. 2, illustrating the paths of the magnetic flux lines emanating from the magnetized areas on the face of the disk.

Referring now more particularly to FIG. 1, an input member or shaft 50 is indicated as operating into a thirteen-digit encoder 51, whereby the annular position of the shaft 50 is recurrently sampled. The output of a signal generator 52 is coupled to the shaft position encoder 51 for providing programming or interrogating signals to the pickup units of the encoder. Twenty-five parallel output channels from encoder 51 (one for the first track and two for each other track) are applied to an electronic system 53 including a detector, amplifier, clipper and pickup selector. System 53 provides thirteen parallel output channels, each channel representing one digit signal of the thirteen digit code group or number (here thirteen digits are used as an illustrative example only, more or less digits can be provided depending upon the desired resolution). As will be more fully explained, the encoding of the shaft 50 is preferably in pure or standard binary code.

To better explain the operation of the system 53 and of the encoder 51, reference is made to the code disk or record wheel shown in FIG. 3. Assume for the moment (to simplify the drawings) that the code record disk is for a five-digit code and of the form illustrated which represents the pattern of a pure or standard binary code. The reference position from which the angle is measured is numbered as the sector zero. The rotation of the shaft to which the code wheel is fixedly secured may be represented by any desired function of time; thus, the disk may be stationary or rapidly accelerating or decelerating in a clockwise or counter clockwise direction. For a five-digit system, the code wheel is divided into thirty-two discrete or quantized sectors, numbered from zero to thirty-one. The number of sectors into which the circle is divided is, in general, $2^n$, where $n$ is the number of desired digital bits or digits employed. Each digit is obtained from reading out a single coded "track." A coded track may assume various geometrical configurations depending on the track-carrying member. On the face of a disk it is convenient to provide annular tracks consisting mostly of a single ring. The terms "tracks" and "rings" are hereinafter used synonymously. It should be clearly understood, however, that a single track may consist of more than a single ring; the second ring of a biannular track is herein termed the "auxiliary" ring. Rings 61–65 on the face of the disk are preferably arranged as shown so that the coarsest (last) ring 65 is the innermost and so on to the first or finest ring 61 which is the outermost. The digit signals produced by the radially aligned pickup units (heads) 61′–65′, respectively associated with rings 61–65, are two level signals, preferably simply "on" or "off" signals which are generally referred to as binary signal digits, "0" or "1." If the shaft position is such that the pickup units 61′ to 65′ fall in the sector 7, the parallel output digit signals which are simultaneously generated are in standard binary terms "00111." If the relative displacement of the wheel and the pickup units is such that the consecutive sector 8 is under the pickup units, the digit signal output becomes in standard binary terms "00010."

In the illustrated example, only five-digit signals quantize or define the shaft's position within an angle of $360°/32=11.25°$ which is a relatively coarse resolution of the angular position of the shaft. Precision encoders, therefore, require a greater number of digits, and the angular resolution in degrees for a disk with a ten-digit code will be $360°/1024=0.3515°$. Similarly, a disk with a fifteen-digit code affords a resolution within a sector of $360°/2^{15}$ which is $360°/32768$ or $0.011.°$ As stated previously, the number of pickup heads employed in FIG. 1 equals the number of digits, i.e., five. When the number of digits is greater than five, say, ten, then the pickup heads would need to be aligned precisely within a sector of 0.3515°. It is evident that a slight twist in alignment would result in the pickup of digits of 2 or more contiguous sectors during the transitional displacement of the shaft from one sector to the other and this would furnish completely erroneous binary number readings.

To avoid the inherent ambiguity of the pure binary code pattern such as shown in FIG. 3 (when only a single pickup unit is employed per ring), several schemes have been suggested. Generally, these schemes provide special code patterns which are variations of the pure binary code. An example of a special code pattern is shown in FIG. 4. This five-digit pattern employs a cyclic binary code, commonly known as the "Gray" code. A disk coded in the "Gray" code also contains five rings (or tracks) 61 to 65 and provides the same number of quantized sectors, $2^n$, as in the pure binary code disk, but it has the advantage in changing no more than a single digit between two consecutive sets of digit signals as the pickup heads sense the incremental disk displacement between two contiguous sectors. To illustrate, in the pure binary code as shown in FIG. 3, contiguous sectors 7 and 8 are written as "00111" and "01000," respectively, hence, at the crossing of the common radius, four out of the five signal digits change to their opposite digits ("1" to "0" or vice versa). If the pickup units are very slightly twisted or misaligned, the digits will not change simultaneously thereby providing a multitude of erroneous readings into the computer system. On the other hand, in the cyclic binary code as illustrated in FIG. 4, contiguous sectors 7 and 8 are written as "00100" and "01100" respectively and, therefore, the two numbers differ only by a single digit. The disadvantage of the cyclic code, as noted previously, is that the output digit signals, before they can be effectively employed, must be first translated into digit signals in the pure binary code. This disadvantage offsets the gained advantage resulting from the lack of reading ambiguity.

The latent ambiguity in the reading of the standard binary code is removed, in one embodiment of the invention, in a manner illustrated in FIG. 5 which is similar to FIG. 3 except for the added pickup heads.

Ring 61 is provided with a single pickup unit **61*a*; ring 62 has a leading pickup unit 62*a* and a lagging unit 62*b*; ring 63 has a leading unit 63*a* and a lagging unit 63*b*, and so on. (NOTE.—The terms leading and lagging refer respectively to units shifted toward increasing and decreasing numbers.) Units 62*a* through 65*a* are radially aligned; similarly, units 62*b* through 65*b* are also radially aligned. The geometry is such that the leading and lagging pickup units are mounted respectively along the leading and lagging radii of a unit sector or quantum as defined by the first (finest, or least significant) track 61. Then, the single pickup head 61*a* on the finest track 61′** lies on a bisector, as shown. This arrangement holds for any number, *n*, of tracks.

Since each pickup head will furnish a binary digit signal and, further, since only one output digit is required per track for any discrete binary number, external means must be provided for selecting either the output of a leading pickup unit or of a lagging pickup unit. The selection is performed in accordance with the following rule: if the single reading head 61*a* on the first track 61 reads binary digit "0," then read all the leading heads 62*a* through 65*a*; on the other hand, if the single head reads binary digit "1," then read all the lagging heads 62*b* through 65*b*. Only one logical "decision" is required for the proper head selection. When the number of digits (or tracks) is great, say, 10, a quantum unit or sector, referenced to the first track, is 0.3515°. In such a case, it would be virtually impossible to properly align all the leading and all the lagging reading heads on the respective bordering radii of such a minute sector.

Figures 6, 7A, 7B:
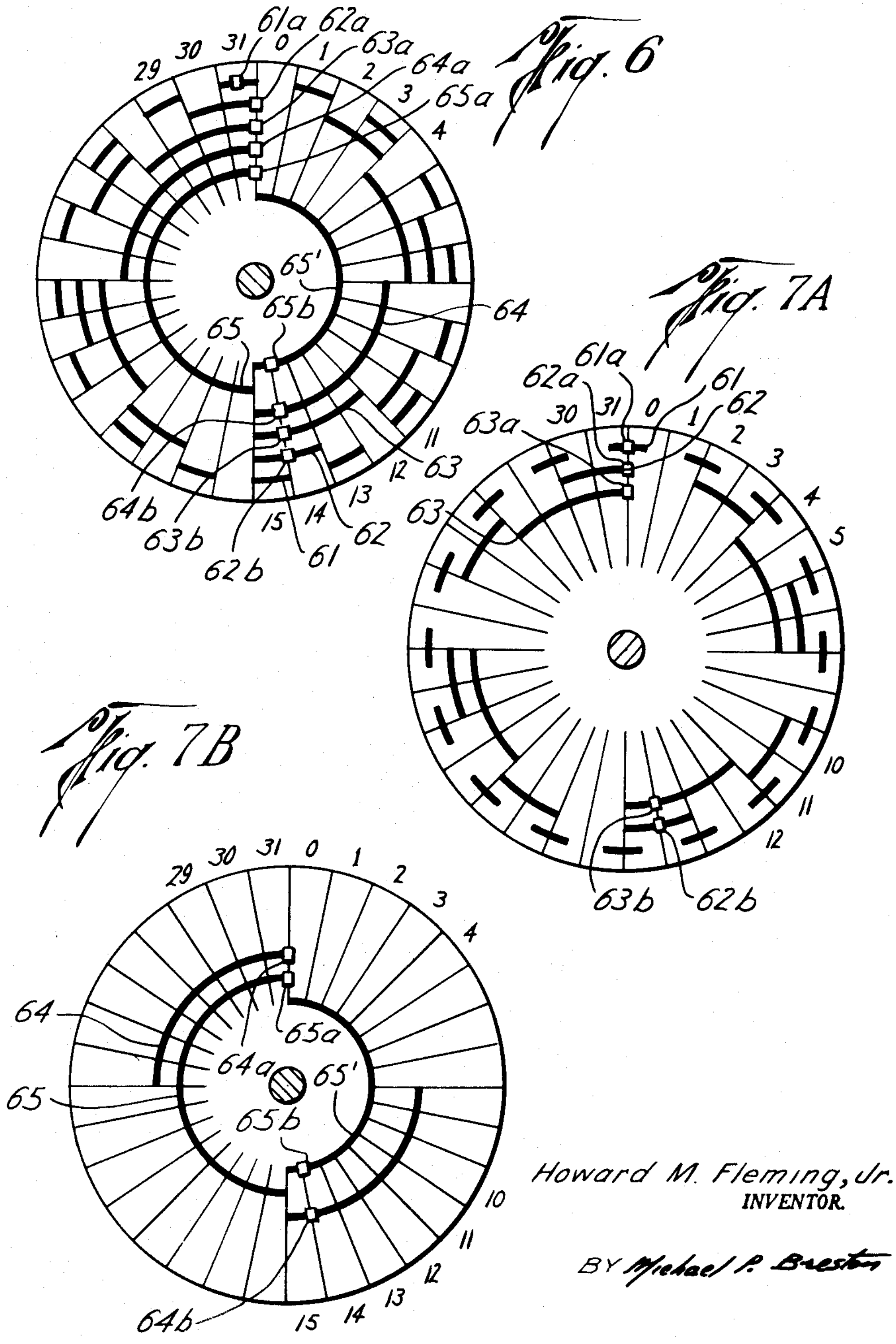

Advantage is taken of the fact that in a standard binary code, all rings, except the innermost (coarsest), have an even number of binary "1" digits (represented as heavy black arcs or segments) and an even number of "0" digits (white arcs), symmetrically arranged with respect to the center of the disk. For example, each of rings 61 through 64 provides the same set of binary digits "1111" for sector 15 as well as for its diametrically opposite sector 31. Hence, the lagging heads 62*b*, 63*b* and 64*b* can be aligned on a diametrically opposite radius, as shown in FIG. 6 (the same holds true for the leading heads). Their output digit signals in sector 15 will be identical to those obtainable from sector 31. To compensate for the lack of symmetry on the innermost (last) ring 65, an auxiliary ring 65' is provided, preferably of smaller diameter and shifted 180° so that the two black semi-circular arcs form a 360° angle. Lagging pickup head 65*b* is associated with the auxiliary ring 65' and in radial alignment with the other lagging heads 62*b*–64*b*, as shown in FIG. 6; the leading pickup head 65*a* remains on track 65 in radial alignment with the remaining leading units 62*a*–64*a*. With this auxiliary ring arrangement, the output digits of all the lagging heads in sector 15 (including 65*b*) are the same as those obtainable from the original sector 31, specifically, "1111." A close inspection of FIG. 6 will reveal that this identity of readings derived from the lagging heads holds true for any two diametrically opposite sectors on the disk.

When small disks are employed, or when the number of rings is great, some inner rings may be conveniently placed on the opposite face of the disk.

In FIG. 7*a* is shown one face of a disk carrying only outer tracks 61–63 and in FIG. 7*b* is shown the opposite face of the same disk carrying the remaining tracks 64, 65 and the auxiliary ring 65'. The number of rings carried on either side of the disk is arbitrary, for convenience, the rings are equally divided. For example, in a seven-digit disk, tracks 1 to 4 are located on one face and tracks 5 to 7 and the auxiliary track 7' are arranged on the opposite face. In FIG. 7*a*, the leading and lagging pickup heads 62*a*–63*a* and 62*b*–63*b* respectively, remain on tracks 62 and 63 in the same relative positions as described in relation with FIG. 6. The leading pickup heads 64*a* and 65*a* and the lagging pickup heads 64*b* and 65*b* are placed on the other side of the disk, preferably on greater diameter tracks, so as to provide a binary number representing the number of the operative sector, in the figure illustrated, it is sector 31.

To enable the mounting of the single pickup head 61*a* on a common board with the leading heads, the first track is advanced by one-half sector with respect to the remaining tracks. It could also be mounted with the lagging heads if the first track is retarded by one-half sector. It should be understood that if it were desired to place the leading or the lagging heads in different positions than in radial alignment, the corresponding rings could be shifted with respect to the zero sector. In practice, however, it is advantageous, particularly in compact encoders, to be able to mount as many pickup heads as possible on a single board.

The following description relates to one preferred embodiment of a thirteen-bit (or 13-digit) position encoder, shown in FIG. 2, which can be employed with the electronic system 53 of FIG. 1. A complete description of this embodiment of the encoder is given in application Serial No. 94,846, entitled "Shaft Encoders," filed in the name of Warren Walter Sullivan and assigned to the same assignee. Without going into the details of the mechanical construction of the encoder, briefly, it comprises two small code wheels 70 and 80 fixedly mounted on shafts 50 and 55, respectively. A train of gears 56 is conveniently provided for coupling shaft 50 to shaft 55. The gearing ratio is suitably selected as 64:1 which affords one revolution of disk 80 for every 64 revolutions of disk 70. Each shaft is suitably supported for rotation by stainless steel bearings 57. The shafts are rotatable and, hence, the disks are rotatable in relation to a condition to be measured and, therefore, the position of each disk may indicate the magnitude of a force which drives the input shaft 50 or the amount that shaft 50 has been rotated. Since each disk may be relatively very small and does not frictionally engage other parts, the disks and the shafts may be rotated easily and at relatively high speeds.

Each disk has a plurality of magnetized areas (segments or spots) on each face thereof and all the areas on each face preferably have one magnetic polarity. On the other hand, if the magnetized segments are sufficiently spaced apart, they may have different magnetic polarities. The magnetized segments are polarized and disposed so that the magnetic flux lines emanating thereof extend substantially perpendicularly from the face of the disk. In the preferred form of the invention, disks 70 and 80 are formed of a high coercivity material which may be permanently magnetized in very small discrete areas, an example of such material being barium ferrite. The disk may be mganetized by subjecting it to an intense, concentrated magnetic field in the areas to be magnetized, for example, by the use of an electromagnet energized by direct current. The magnetized areas may be as small as 0.02 inch in diameter or less, and, if adjacent spots are of the same polarity, the spacing between the spots may be of the same order as the diameter of a spot. It has been found that more than fifty areas per inch may be magnetized on a barium ferrite disk, permitting a greater resolution than 1/50 of an inch with the apparatus of the invention.

A partial cross-section of a code disk fabricated of barium ferrite is shown in FIG. 11. The main reasons why the magnetic material employed to manufacture the disks should have a high coercivity are: (1) to enable minute spot magnetization of the disk, (2) to ensure that the magnetic flux lines do not penetrate through the entire thickness of the material especially when it is desired to code both faces of the disk (a material of low coercivity would act as a blotting disk for the flux lines), (3) to obtain sufficient flux densities to saturate the reading heads as will be explained hereinafter, and (4), since the relative permeability of barium ferrite is substantially equal to one (the same as air), to obtain flux lines emanating substantially perpendicularly from the face of the disk as shown in FIG. 11.

The magnetic pattern of a five-bit disk in standard binary code is similar to the pattern shown in FIG. 3 wherein the white arcs of each ring represent flux emanating areas. Similarly, when both faces of the disk are magnetized, the flux distribution on each face of the disk would be arranged as shown in FIGS. 7*a* and 7*b*. Consequently, the previous description relating to the coded disks shown in FIGS. 3 through 7 and to the number of rings and sectors on each disk is applicable to the magnetic disks 70 and 80 of FIG. 2.

Disk 70 has on face 70' thereof, four magnetic rings or tracks 71 to 74, shown in cross section as dotted semicircles, and on its other face 70", three additional rings 75–77 and an auxiliary ring 77'. Disk 70 is therefore a seven-digit disk, track 71 being the first (finest) track and track 77 being the last (coarsest) track. Auxiliary ring 77' is provided to ensure symmetry for the last track 77, as was previously explained in conjunction with track 65' of FIG. 6. Similarly, disk 80 has on one face 80' thereof, three magnetic rings 81 to 83 and on its other face 80", three other rings 84–86 and an auxiliary ring 86'. Hence, disk 80 is a six-bit disk which together with disk 70 forms a thirteen-bit encoder providing thirteen simultaneous digit signals, forming binary numbers for the encoding of the positions of shaft 50.

To read the coded tracks, a plurality of re-entrant miniature magnetic cores are employed as the pickup heads. The dimensions of each core are of the same order as the dimensions of the smallest magnetized area. Toroidal re-entrant cores made of a ferrite material having an outside diameter of 0.050 inch, an internal diameter of 0.030 inch and a thickness of 0.015 inch have been employed and such cores have been spaced approximately 0.003 inch from the face of the disk. The magnetic cores which are preferred for the apparatus of the invention are saturable cores exhibiting a "square loop" hysteresis curve. Preferably, each core is of a material which is saturable by the flux lines emanating from the smallest magnetized spot when adjacent thereto.

Track 71 has a single core 70*a* associated therewith and each of the remaining tracks 72 through 76 has a leading core 70*b* and a lagging core 70*c* associated thereto. Track 77 has a leading core 70*b* and ring 77' has a lagging core 70*c*. On disk 80, each of tracks 81 through 85 has a leading core 80*b* and a lagging core 80*c*. Track 86 has a leading core 80*b* and auxiliary ring 86' has a lagging core 80*c*.

In the preferred embodiment, each core is provided with an input (interrogate) winding 90 and with an output (read) winding 91. One lead from each output winding is connected to a common bus wire or ground (not shown) the other lead carries the output digit signals to the electronic system 53 of FIG. 1.

The number of turns on each winding depends upon the operating conditions such as the frequency of the interrogating signal, the magnetic characteristics of the cores, the magnitude of the readout signal desired, the circuits employed for readout, etc. In one embodiment of the invention, each input winding 90 consisted of a single turn of No. 36 wire and each output winding 91 consisted of 22 turns of No. 40 wire. When a 500 milliampere alternating current having a frequency in the range of 40 kc. to 200 kc. is applied to an interrogate winding, an approximately one volt peak-to-peak output signal is obtained from the read winding when no magnetized area is immediately adjacent to the core, and a 50 to 60 millivolt output signal is obtained when a magnetized area is opposite to the core, thereby providing binary "on" and "off" digit signals having a ratio greater than ten.

In a preferred operation of the encoder, the interrogate windings 90 are all connected in series and energized by a single signal generator as shown in FIG. 8. A current limiting resistor is connected series for providing the proper energizing ampere-turns. There is little restriction on the wave shape of the interrogate signal current. It may be a sine or square wave or even a pulsed current: as long as both positive and negative signal swings are present which leave the cores in their proper remanent state, good operation will be obtained. The operation of each toroid is as follows: On one hand, when the toroid is not in a magnetic flux field, the A.C. interrogate signal, of sufficient amplitude, causes the toroids to alternately switch from one remanent state to the other. As each toroid switches, pulses of alternating polarity are generated in its output winding 91; on the other hand, when the core is in a magnetic field of sufficient density, as shown in FIG. 11, the flux lines emanating from the face of the disk saturate both legs of the core. Because of flux field geometry, the left leg of the toroid is saturated in one direction while the right leg is saturated in the opposite direction. Consequently, the flux created during each one-half cycle by the interrogate signal will aid saturation in one leg of the toroid and buck saturation in the other leg. Hence, during the process of interrogation, the core is alternately saturated in one side, then in the other. But, as long as some part of the toroid is saturated, regardless of which side it may be, no output signal is generated in the read winding 91.

The frequency of the interrogate signal is not critical: values of 20 kc. to 200 kc. have been successfully used. For optimum output, a frequency of 40 kc. to 50 kc. is recommended. A 500 milliampere-turns is generally required for proper switching of the toroids. Approximately 20 milliwatts of input power are required to operate each core.

It will be appreciated that a readout may be obtained regardless of whether the code disk is stationary or moving. Furthermore, when the code disk is moving, its flux field sweeps across the reading head in such a manner that equal and opposite flux lines are induced in each leg of the toroid, causing a net flux density around the toroid of zero, hence, no E.M.F.'s or spurious signals will be generated in the windings on the toroid as a result of relative motion between the cores and the disks, and therefore, no loading is added to the code disks. As an alternative to operating the encoder with a continuous interrogate signal, it may also be interrogated with single-cycle pulses applied to the interrogate windings and observing the resultant output pulses on the output windings. As in the case of continuous interrogation, when the toroid is in a flux field and saturated, no output pulse will appear in the output winding. Inversely, when the toroid is not in a field and is unsaturated, an output pulse will be generated in the output winding. However, in this type of operation, a single cycle interrogate pulse must make a complete positive and negative excursion in order not to leave the toroids in the wrong remanent state. One microsecond pulses have been used to successfully read the encoder.

Although the operation of the encoder has been described in conjunction with an input and an output winding on each core and the binary digits were obtained by detecting the presence or absence of a voltage on the output winding and thus providing the "on" and "off" signals of the code, it will be apparent that the encoder can equally be operated with only a single winding on each core and the binary digits would be obtained by measuring the impedance of the single winding. Thus, when the reading head is not in a magnetic field, the interrogate signal applied to the single winding causes the toroid to switch alternately from one remanent state to the other and, during the transition between alternate remanent states, the core becomes unsaturated for a short time interval (usually in the order of one microsecond) thereby highly increasing the impedance of the single winding on the core. Conversely, when the reading head is in a magnetic field of sufficient density, the core is always saturated and, therefore, the impedance of the single winding is very low. Typical output impedances when the core is outside of a saturating flux emanating from a magnetized spot are 50 to 100 ohms and when the core is adjacent to a magnetic spot, the impedance is substantially zero. However, regardless of whether the voltage or the impedance is measured, a binary "0" is obtained when the toroid head is saturated by a magnetized spot adjacent thereto and a binary "1" is obtained when the toroid head is between two consecutive discrete magnetized areas on the disk. Consequently, it is the state of saturation of the reading head which determines the output binary digit signals form each track. Hence, the magnetized spots, if properly spaced apart, can be of either polarity as long as they are of sufficient strength to substantially saturate the toroid when it is adjacent thereto.

The raw signals induced in each read winding 91 on each core, as a result of an interrogate signal applied to the input winding 90, before they can be usefully employed, must first be processed into shapes which are acceptable to digital handling systems In addition, since there are two cores associated with each track on each code disk (code scale) except on the first track 71 of the first disk 70, where there is only one core, logical selecting circuits must be utilized to make a decision as to whether the leading or the lagging core of each track should contribute a digit signal to the final output of the electronic system 53, the output representing a specific number for a discrete position of shaft 50.

In FIG. 9 there is shown a typical logical circuit capable of making the necessary decisions in accordance with the selection rule specified in conjunction with the description of the code disk of FIG. 6. For the thirteen-bit encoder of FIG. 2, there are provided twenty-five detector, amplifier and clipper circuits 101 for demodulating the amplitude modulated envelope existing on each output lead of each read winding 91 when the interrogate windings are energized by a continuous alternating signal. Each wave is amplitude modulated for the reason that the magnetic flux lines, emanating from the magnetized areas, sweep through the respective pickup cores and induce in the read windings thereon, variable amplitude signals reflecting the rate of change of flux $d\phi/dt$. Preferably, the detected signal is amplified and then clipped. A single amplifier can be arranged to perform both functions, as is well known in the art. To obtain a symmetrical and substantially square wave, the clipping level of the amplifier should be set to approximately the mid-amplitude level of the detected positive pulses (the negative pulses are removed, for example, by suitably biasing the amplifier input circuit).

The wave forms going into and coming out of the first detector 101 are illustrated in FIG. 9. The wave forms to and from the remaining detectors 101 are similar to those illustrated. The amplitude modulated wave 102 is detected to provide the positive half of its envelope 103 which, after being clipped at its mid-amplitude level, results in a substantially symmetrical square wave 104. This wave 104 will be the nearer to a perfect square wave, the closer the hysteresis curve of each core approaches an "ideal" square, then, the binary "1" digit is equal to the binary "0" digit (this cannot be the case if the core is sliced to provide for an air gap which causes the hysteresis curve of the core to become elongated and greatly distorted).

In sum, the output of each core, when applied to a detector 101, produces at the output thereof a train of binary digit signals representing the relative position of the core with respect to its associated track.

An output reading from the electronic system 53 combines the output digit of the first track with the successive output digits of either the leading cores or the lagging cores. To make that selection there are provided, for the thirteen-digit encoder of FIG. 2, a total of twenty-four AND gates 110, twelve OR gates 111, and two bi-stable binary devices 112. Generally, there are as many bi-stable devices as there are code disks (or code scales); there are $(2n-1)$ detectors, $(2n-2)$ AND gates and $(n-1)$ OR gates.

The detected output square wave 104, representing the first code track 71 on the first disk 70, is applied to the first bi-stable device 112 via a lead 120. Similarly, the output digit signal from the OR gate 111, representing the last code track 77 on the first disk 70, is applied to the second bi-stable device 112 via a lead 130. The bi-stable binary devices 112 are preferably of the "Schmitt" type, arranged to have an extremely sharp rise and fall time and to provide either a binary "1" or a binary "0" at its output terminals. Lead 121 connects one output of the first bi-stable device 112 to a bus wire 123, and lead 122 connects the other output to bus wire 124. Since only representative tracks are illustrated in FIG. 9, the bus wires are broken in part to indicate that the remaining connections are identical to those shown. Similarly, one output from the second bi-stable device 112 is applied via lead 131 to a common bus wire 133 and the other output is applied to a bus wire 134 via a lead 132.

Bus wires 123 and 133 are connected to one input of each AND gate 110 which is coupled to each of the output windings 91 on the lagging pickup cores 70c and 80c. And, bus wires 124 and 134 are connected to one input of each AND gate 110 coupled to each of the output windings 91 on the leading pickup cores 70b and 80b, as shown.

In a preferred operation of the logical network shown in FIG. 9, when the output from the core 70a on the first track 71 provides to lead 120 a binary digit "1," then the output of the first bi-stable binary device 112 is also a binary digit "1" applied to bus wire 123. Hence, when the output of the first track 77 is a "1," all the AND gates 110, associated with the lagging cores 70c on tracks 72–76 and 77', become energized or "open" to pass existing signals, if any, on the output windings of the lagging cores 70c.

The output signal of each thusly energized AND gate 110 can pass directly through its corresponding OR gate 111 to provide a single output digit signal for each track, which, when combined with the digit "1" signal derived directly from the first detector 110 associated with the first track 71, furnishes a set of digit signals resulting in an unambiguous output binary number reading for the particular position of the first disk 70.

Similarly, when the output digit from the first track is a binary "0" on lead 120, a binary digit "1" will appear on bus wire 124 which will "open" all the AND gates 110 coupled to the leading cores 70b on tracks 72–77 to pass any signal which might exist in the output windings 91 on the leading cores 70b. This signal will pass directly through the corresponding OR gate 111 to furnish for each track a single binary digit at the output thereof, which, when combined with the "0" digit derived directly from the first track will provide a binary number for the particular shaft position of the first disk 70. Consequently, the output of the first track (71) on the disk 70 determines the selection of either all the leading pickup heads or of all the lagging pickup heads.

If the gearing mechanism 56 were ideal, this output of the first track would also determine the selection of either the leading or of the lagging pickup heads on the second disk 80. In practice, however, it is preferable to make a second logical decision based on the output of the last (coarsest) track 77 of the first disk 70.

The second decision is made in a manner similar to the first decision. Thus, when the last digit of the seven-bit disk 70 is a binary digit "1," a "1" signal will appear on bus wire 133 to open the AND gates 110 associated with outputs from the lagging cores 80c to pass any signals which might exist on the output windings 91 thereof. The outputs from these AND gates, if any, will pass through their corresponding OR gates to provide a set of digit signals for the position of the second disk 80. Similarly, when the last digit of disk 70 is a binary "0," then a binary "1" will appear on bus line 134 to energize the AND gates associated with the leading cores 80b to pass therethrough any signals which might exist on the output windings 91 thereof. The outputs from these AND gates will pass through the corresponding OR gates 111 to furnish a single set of digit signals for the position of disk 80.

In sum, when the first (least significant) digit of the first track 71 on the first disk 70 is a binary digit "1," all the lagging cores 70c associated with the remaining tracks of disk 70 are read. Inversely, when the output digit of the first track on the first disk 70 is a binary "0," all the leading cores are read. Similarly, when the last (most significant) output digit of the 7th track of the first disk 70 is a binary "1," all the lagging cores 80c of the second disk 80 are read, and, finally, when the output of the 7th track is a binary "0," all the leading cores 80b are read. It will therefore be appreciated that the logic circuit of FIG. 9 performs the selection between the lead and the lag cores in accordance with the rule previously described with reference to FIG. 6. Hence, from the output of the electronic system 53 are derived 13 parallel output channels, each providing simultaneously a digit signal corresponding to the position of the moving shaft 50.

As is well known, in the binary system of counting the base is "2" and the individual digits only represent the coefficients of powers of two (rather than ten as in the decimal system). Therefore, the output digit of the least significant track-1 is the coefficient of "$2^0$," the output digit of track-2 is the coefficient of "$2^1$," and so on as shown in FIG. 9.

It will be apparent from the foregoing description that although the code carrying members were illustrated as wheels or disks and the code patterns or code scales were in circular form, the invention is equally applicable to linear code scales such as may be applied to rotating drums, etc.

In FIG. 10 are shown portions of two linear scales 200 and 201, each carrying a pure binary code such as can be placed on two drums (not shown) fixedly secured on two rotatable shafts. Scale 200 carries a seven-bit binary code pattern and scale 201 carries a six-bit code pattern. Shafts 203 and 204 are mechanically coupled by a gearing mechanism 202 having a gearing ratio 64:1, as in the embodiment of FIG. 2. The first or finest track carries a single pickup head 211 and each remaining track carries two pickup heads. All the leading pickup heads 212*a* on each scale are separated from all the lagging heads 212*b* by a segment or quantum of the first track so that the first pickup head 211 would be separated from either the lead or the lag heads by a one-half of a quantum. However, as in FIG. 7*a*, it is preferred to mount the first pickup head 211 in alignment with either the leading heads or the lagging heads by displacing the code pattern of the first track by one-half segment or quantum. In FIG. 10 the first track is advanced by half a quantum. It will be appreciated that in accordance with this invention, in the embodiments of FIGS. 2 and 10, the leading pickup heads can be conveniently mounted on a single supporting board and the lagging heads can similarly be mounted on another board. Since the operation of the embodiment of FIG. 10 is in all other respects similar to the embodiment of FIG. 2, no further description thereof need be given.

Having thus described my invention with particular reference to the preferred forms thereof and having shown and described certain modifications, it will be obvious to those skilled in the art to which the invention pertains, after understanding my invention, that various changes and other modifications may be made therein without departing from the spirit and scope of my invention, as defined by the claims appended thereto.

What is claimed is:

1. A digital encoder comprising in combination, at least one disk having on at least one face thereof a binary pattern of coded tracks, each track delineating a number of discrete permanently magnetized areas defining magnetic flux concentrations of limited arcuate extent emanating from each face; a plurality of small re-entrant core members composed of ferromagnetic material affording a single gapless magnetic circuit for decoding said tracks; said plurality including a single core member for decoding the least significant track of said pattern and a pair of spaced core members for each of the remaining tracks; the separation between the two cores of each pair, measured in quantum units of said least significant track, being substantially the same on each of said remaining tracks; each of said flux concentrations being of sufficient intensity to substantially saturate said material when said core member is within the arcuate extent of a flux concentration; means including a shaft for axially supporting and rotating said disk with the coded faces in closely spaced tangential relation to the periphery of each core member; and an excitation winding and a readout winding on each core member for transforming an alternating current applied to said excitation winding into a train of modulated signals in said readout winding induced by the switching of said core member between its opposite remanent states, and logic circuit means for processing said modulated signals to provide a binary output signal indicative of the shaft's positions, said logic circuit means including a plurality of detectors having input and output circuits, each readout winding being connected to the input circuit of one detector, and means including gating means for selectively gating the output signals from said detectors to provide said binary output signal.

2. A digital encoder comprising in combination, a first magnetic disk and a second magnetic disk, each disk having on each end face thereof a pattern of discrete, permanently magnetized areas arranged concentrically with respect to the axis of said disk to form a binary code, said disk being substantially unmagnetized intermediate said areas, said areas each having a single magnetic polarity and being of limited arcuate extent to define concentrations of magnetic flux emanating from each face; a re-entrant, annular core member for decoding the outermost concentric arrangement of areas in said pattern on one of said faces, and a pair of re-entrant, annular core members for each remaining concentric arrangement of areas in said pattern; the separation between the two core members of each pair, measured in unit sectors of said outermost concentric arrangement, being substantially the same for each remaining concentric arrangement; said core members being composed of ferromagnetic material and having a substantially rectangular hysteresis characteristic curve and said core members being saturable by respective ones of said flux concentrations; means supporting said first and said second disks for rotation of each face in closely spaced tangential relation to the periphery of each of said core members; an excitation and a readout winding on each of said core members for transforming an applied alternating current to said excitation winding into a train of modulated signals corresponding to the switching of said core member between opposite remanent states on said hysteresis characteristic curve, and logic circuit means for processing said modulated signals to provide a binary output signal, said logic circuit means including a plurality of detectors, each readout winding being connected to one detector, and means including gating means for selectively gating the output signals from said detectors to provide a binary output signal representing the relative positions of said first and second disks.

3. Position sensing apparatus comprising in combination, a first movable magnetic member and a second movable magnetic member, said first and said second movable members each having spaced magnetized areas forming a binary code pattern consisting of a number of magnetic tracks, and a plurality of saturable re-entrant magnetic cores, each core having at least one excitation winding and one readout winding on each of said cores, said cores being adjacent each of said members for decoding said tracks, said plurality including a single core member for decoding the least significant track of said pattern on said first member and a pair of cores for each of the remaining tracks on each of said members; the separation between the two elements of each pair, measured in quantum units of said least significant track, being substantially the same on each of said remaining tracks; one core member of each pair being spaced in leading relation to said code pattern with respect to said single core member and the other core member of each pair being spaced in lagging relation with respect to said single core member; means applying an alternating signal to each excitation winding and logic means for readout of each lagging core or each winding of each leading core in dependence upon the relative position between said single core member and said first movable member, said logic means including at least one detector connected to each of said readout windings, a first bistable device, a second bistable device, first gating means for gating signals representing the positions of said first magnetic member, and second gating means for gating signals representing the positions of said second magnetic member, said first bistable device selectively applying to said first gating means the output signal from the detector detecting the signal from the readout winding on said single core, said second bistable device selectively applying the output signals from said first gating means to said second gating means, the combined output signals from said first and second gating means representing the relative positions of said first and second movable magnetic members.

References Cited in the file of this patent

UNITED STATES PATENTS

| | | |
|---|---|---|
| 2,852,764 | Frothingham | Sept. 16, 1958 |
| 2,933,718 | Arsenault | Apr. 19, 1960 |
| 2,938,199 | Berman | May 24, 1960 |
| 3,113,300 | Sullivan | Dec. 3, 1963 |